United States Patent [19]

Ichihara et al.

[11] Patent Number: 4,832,233

[45] Date of Patent: May 23, 1989

[54] PARTICLE DISPENSING APPARATUS

[75] Inventors: Issey Ichihara, Funabashi; Kenshi Toshimitsu, Kawasaki, both of Japan

[73] Assignee: Kabushiki Kaisha Toshiba, Kawasaki, Japan

[21] Appl. No.: 114,858

[22] Filed: Oct. 30, 1987

[30] Foreign Application Priority Data

Oct. 31, 1986 [JP] Japan ............................ 61-259723

Oct. 31, 1986 [JP] Japan ............................ 61-259725

[51] Int. Cl.⁴ ............................ B65G 69/06

[52] U.S. Cl. ............................ 222/201; 222/233; 222/DIG. 1; 118/653

[58] Field of Search ............... 222/201, 196, 411, 414, 222/410, 310, 311, 112, 625, 624, 226, 233, 234, 235, 408.5, DIG. 1; 118/653, 308; 366/128, 108

[56] References Cited

U.S. PATENT DOCUMENTS

| | | | |
|---|---|---|---|
| 548,713 | 10/1895 | Laramy | 222/625 |
| 2,527,876 | 10/1950 | Curtis | 222/233 |
| 2,533,386 | 12/1950 | Masters | 222/414 |
| 2,801,773 | 8/1957 | Vitkin | 366/108 |
| 3,212,624 | 10/1965 | Hess | 222/196 |
| 4,558,659 | 12/1985 | Alder | 118/653 |

*Primary Examiner*—Joseph J. Rolla
*Assistant Examiner*—Kenneth Noland
*Attorney, Agent, or Firm*—Foley & Lardner, Schwartz, Jeffery, Schwaab, Mack, Blumenthal & Evans

[57] ABSTRACT

The present invention provides a particle dispensing apparatus comprising, an elongate transport guide apertured along its length; a transport device within the guide for transporting particles introduced through an entrance port into the guide and along the guide until they fall through the apertures to the outside of the guide; an elastic plate is secured to the guide, has a shaped edge portion partially covered with the opening area of the aperture in the guide and the guide is supported so as to be free to move in response to vibratory forces. When using this invention, since the transport guide is arranged so that it is free to move within the system such as the developer and can be vibrated slightly by the vibration due to the rotation of the developing roller in the developing system or the vibration of the developing system itself when operating, even if, by any chance, aggregated toner should block the apertures in the transport guide, this state can be broken down by this slight vibration of the transport guide.

19 Claims, 6 Drawing Sheets

PARTICLE DISPENSING APPARATUS

BACKGROUND OF THE INVENTION

1. Field of the Invention

This invention relates to a particle dispensing apparatus which are used for supplying powdered particles such as developing a agent to image forming systems such as, for instance, electronic copying machines.

2. Discussion of Background

Generally, in the case of electronic copying machines, toner is normally supplied when required to the developer of a developing system in order to make the toner density in the developing agent uniform.

Hitherto, as shown in simplified FIG. 1, this kind of electronic copying machine has been designed as follows. Drum-shaped photosensitve body 2, which is free to rotate, is provided as an image carrier which is pivoted so that it is free to revolve approximately in the centre of system cabinet 1. This photosensitive body 2 is uniformly charged by charging charger 3. At the same time, an electrostatic latent image of an original document (not illustrate) illustrated, which is placed on original document platform 4 made of transparent glass, is formed on photosensitive body 2 via optical system, 5 which is composed of exposure lamp 5a, 1st, 2nd and 3rd reflecting mirrors 5b, 5c and 5d, lens 5e and 4th reflecting mirror 5f. This electrostatic latent image is developed by coating the developing agent from a developing system which is described later.

This image is transported towards copying charger 6. This copying charger 6 copies the developed image on the copy paper P, which is ordinary paper used as recording paper and has been supplied automatically or manually from paper supply cassette 7 and transported via paper supply rollers 8 and resist-roller pair 9 and 9. The paper is peeled by peeling charger 10 using an AC corona discharge. After copying, copy paper P is peeled from photosensitive body 2 and the developed image passes along transport path 11 and is fuse-fixed by fixing device 12. The paper is then dispensed on the paper dispense tray 14 by dispensing roller pair 13a and 13b.

Then, after the copying of the developed image on to copy paper P and peeling, any developing agent remaining on photosensitive body 2 is cleaned off by cleaning device 15. The potential on photosensitive body 2 is controlled to below a specified level by discharging lamp 16 and photosensitive body 2 is thus ready for the next copying operation.

Developing system 20, which develops the electrostatic latent image formed on photosensitive body 2 in this way, is constructed by 1st and 2nd developers 21 and 21 which form a vertical pair in which different colours of developing agents, for instance red and black, are respectively contained. Each of these developers 21 is composed of developing roller 22, which is a rotating sleeve fitted over a magnetic roller with a number of magnetic pole pieces, and agitator roller 23 which agitates developing agent in developer 21. At the same time, a toner supply device 30 is provided in each of developers 21.

Toner supply device 30 operates when the toner density in the developing agent, which is detected by a sensor (not illustrated) is below a specified level, and thus supplies toner $T_0$ to developer 21. The construction of toner supply device 30 is as follows. As shown in FIGS. 2 to 4, transport guide 31, with a U-shaped cross-section, is provided running between side-frames 21a and 21b of developer 21. A number of supply apertures 32 are opened in the bottom of transport guide 31 so that toner $T_0$ is supplied by dropping. At the same time, transport auger 33 is pivoted in transport guide 31 so that it is free to rotate under the drive of a driving system (not illustrated). By the unidirectional rotation under drive of transport auger 33, toner $T_0$ supplied through a entrance port E from toner hopper 34, which is provided to one side of transport guide 31, is transported in the axial direction (shown by the solid line arrow in FIG. 2) and is supplied to developer 21 by dropping from each of supply apertures 32.

However, in the case of toner supply device 30 in this type of conventional developing system 20, both ends 31a and 31b of transport guide 31 and spindle 33a of transport auger 33 are secured between both side frames 21a and 21b on developer 21. At the same time, as shown in FIG. 3, the positions of the upper edges of transport guide 31, which is supported so that transport auger 33 is enclosed, are, for example, regulated by pressure plate 40 which also acts as a cover for developer 21. Transport guide 31 is normally made of a metal such as aluminum or a synthetic resin such as ABS resin, with a thickness of $1\sim3$ mm. Also, as shown in FIG. 4, normally supply apertures 32 are opened as aperture or slit shapes whose diameters $W_0$ are $1\sim3$ mm.

For this reason, hitherto, since inside walls 32a with depth d of approximately $1\sim3$ mm are formed in supply apertures 32 opened in transport guide 31, the toner is held on inside walls 32a of supply apertures 32 by aggregation due to the charge on toner $T_0$, whose mean particle size is 10$\mu$m, and fluidity due to temperature, and tends to clog so that a smooth toner supply can not be provided.

Moreover, as a means of solving the above disadvantage, enlargement of supply apertures 32 may be considered. However, when using this method, the amount of toner supplied increases so that the agitation in developer 21 by agitator roller 23 can not be sufficiently carried out. Thus, not only do faults such as spattering occur easily, but also, since toner $T_0$ can not be transported as far as the end of transport guide 31, there has been a problem with so-called 'one-sided' toner dropping.

OBJECT OF THE INVENTION

It is an object of the present invention to provide a particle dispensing apparatus which can carry out the smooth supply of particles such as toner to the developer by ensuring the prevention of toner clogging in the supply apertures which are opened in the transport guide.

SUMMARY OF THE INVENTION

To accomplish the objects of the present invention, the present invention provides a particle dispensing apparatus comprising, an elongated transport guide comprised with a base member and an elastic plate adhered on the base member, and the elastic plate has a plurality of apertures which are perforated into the elastic plate for dispensing the particles, transporting means mounted within the transport guide for transporting the particles from the entrance port along the transport guide, such that the transporting means operates, particles are transported from the entrance port through the transport guide and drops through the transport guide apertures to outside of the transport guide, and holding means for holding the transport guide which is arranged so that the transport guide is free to move in response to vibratory forces.

By designing this invention with the above construction, since the free movement of the transport guide arranged in the system, such as developer is facilitated, and also since the transport guide can be made to vibrate slightly due to the rotation of the developing roller in the developing system or by vibration of the system itself when operating, even if, by any chance, aggregated toner should block the supply apertures, the slight vibration of the transport guide can break up the aggregated particles. Thus, reliable prevention of clogging by the particles of the supply apertures opened in the transport guide is possible, and a stable particles supply to the developer can always be provided.

Moreover, by designing this invention with the above construction, since the mouth surrounding the supply apertures, which are opened in the lower part of the transport guide, are formed by thin elastic plate, the diameters of the supply apertures are essentially maintained by this thin elastic plate and, at the same time, since the diameters of the supply apertures can be enlarged, aperture walls which hold the particles are not formed in the supply apertures. Furthermore, the thin elastic plate which forms the mouth surrounding the supply apertures vibrates when operating due to the slight vibration of the system itself. Thus, if, by any chance, aggregated particles should block the mouth surrounds of the supply apertures, this aggregated state of the particles can be broken down due to the vibration of the thin elastic plate. Therefore, particles clogging the supply apertures in the transport guide can be reliably prevented and a stable supply of particles to the system is always possible.

DETAILED DESCRIPTION OF THE PREFERRED EMBODIMENTS

Figure 1:
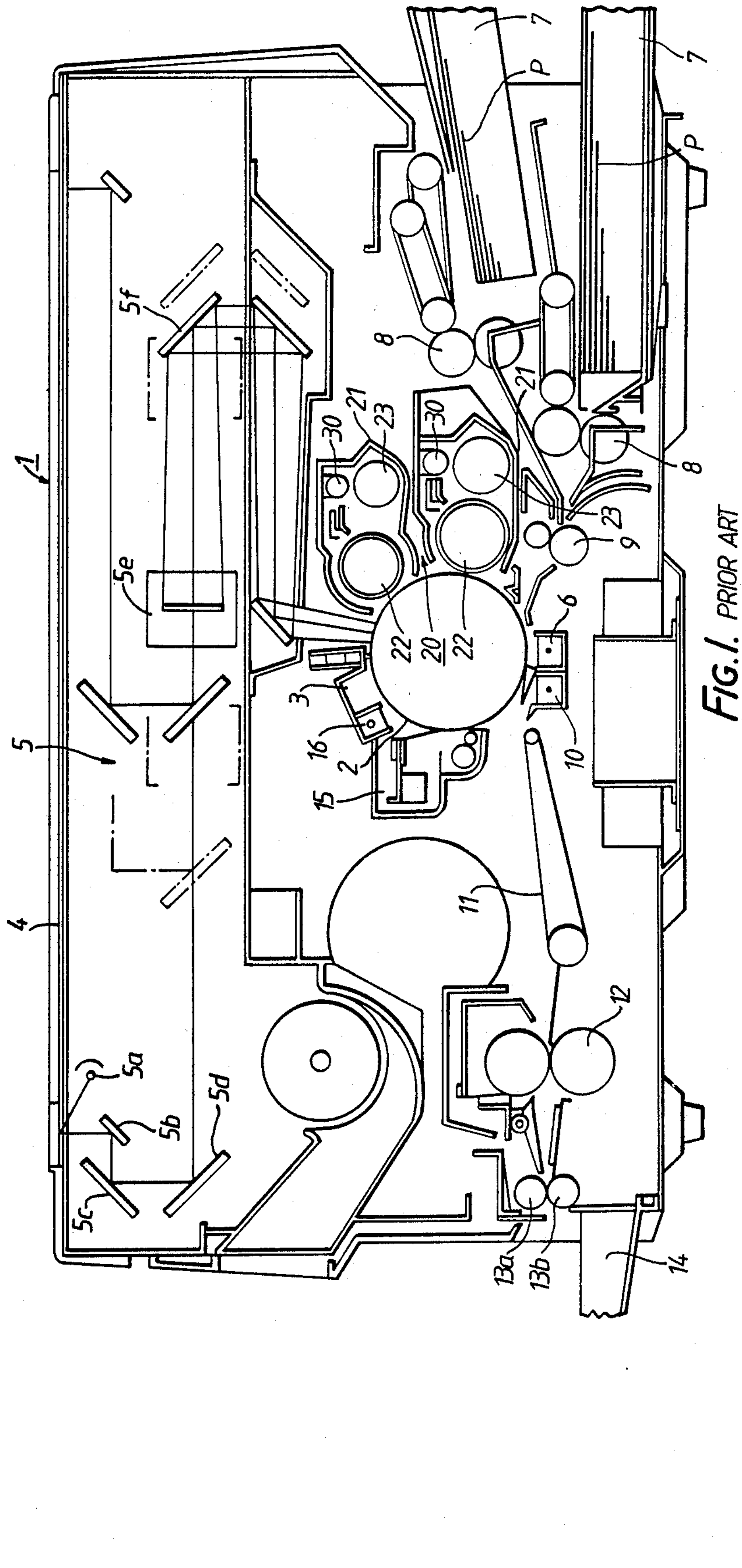
FIG. 1. PRIOR ART
FIG. 1 is a simplified illustration showing the internal construction of a conventional image forming system.
Figure 2:
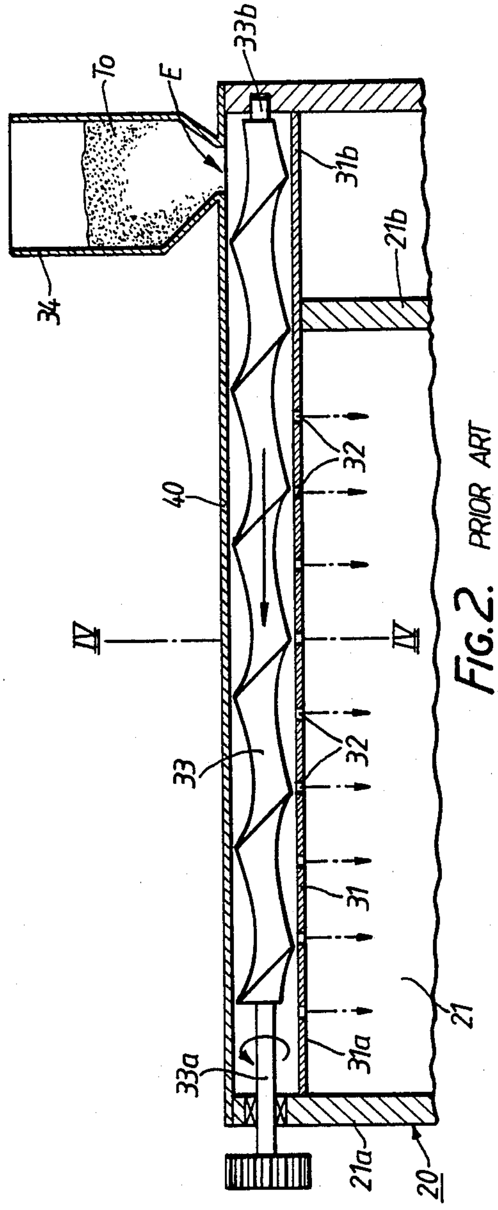
FIG. 2. PRIOR ART
FIG. 2 is a simplified enlarged cross-sectional drawing of the essential parts of the toner supply portion in the same conventional developing system.
Figure 4:
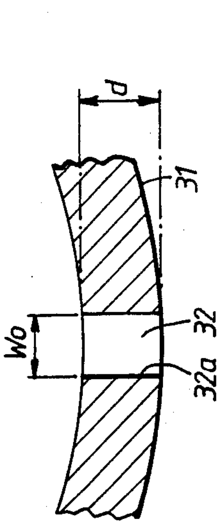
FIG. 4. PRIOR ART
FIG. 4 is a simplified enlarged cross-sectional drawing of the essential part of the supply aperture in FIG. 3.
Figure 3:
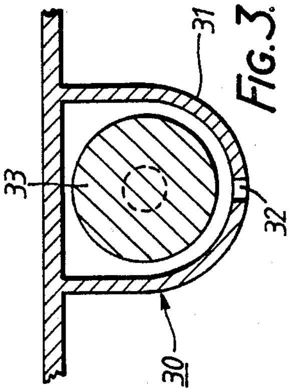
FIG. 3. PRIOR ART
FIG. 3 is a simplified enlarged cross-sectional drawing on line IV—IV in FIG. 2.
Figure 5:
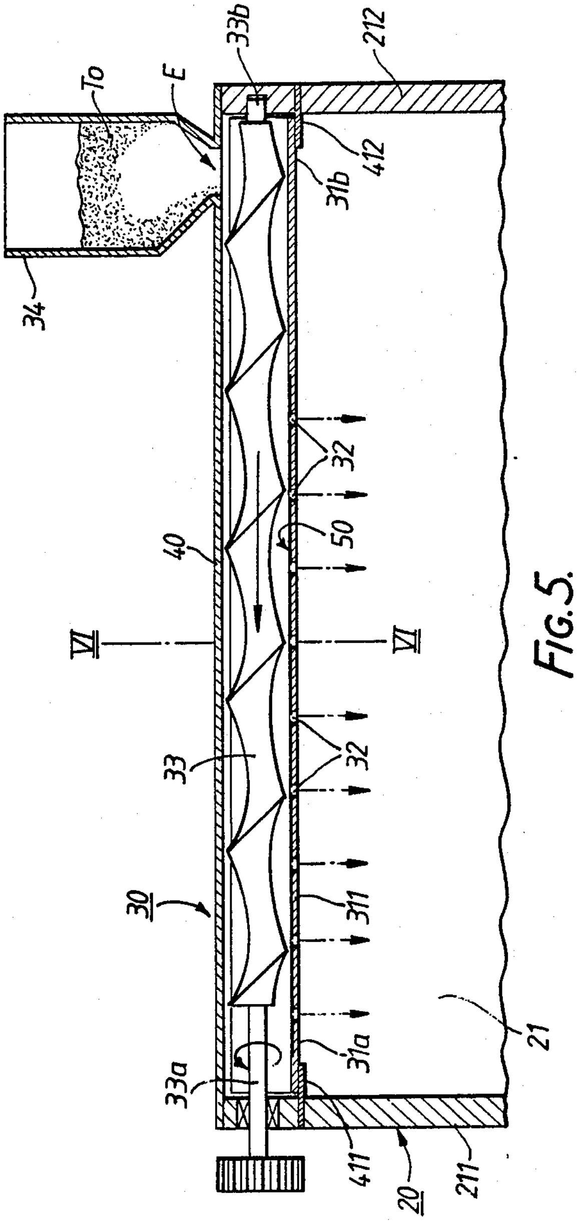
FIG. 5 is a cross-sectional drawing of the toner supply portion of the developing system of this invention.
Figure 6:
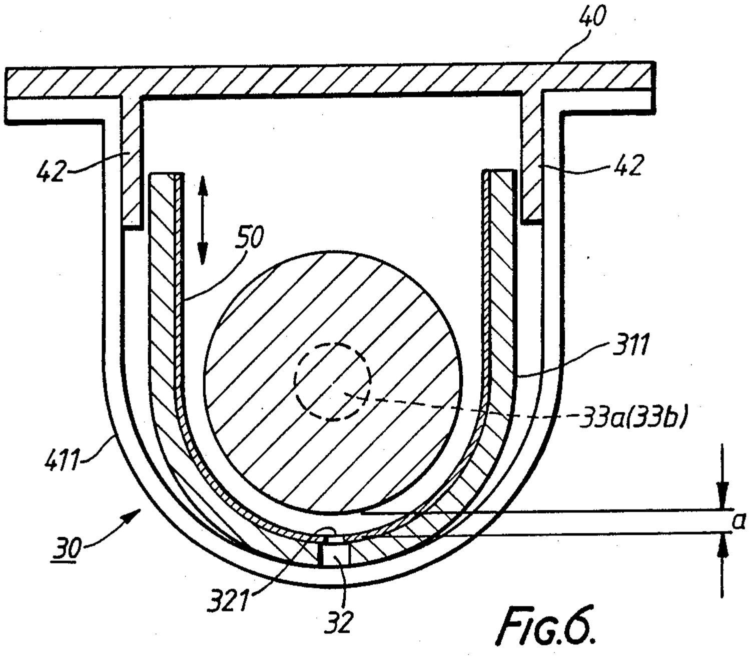
FIG. 6 is an enlarged cross-sectional drawing of the essential parts on line VI—VI in FIG. 5.
Figure 7:
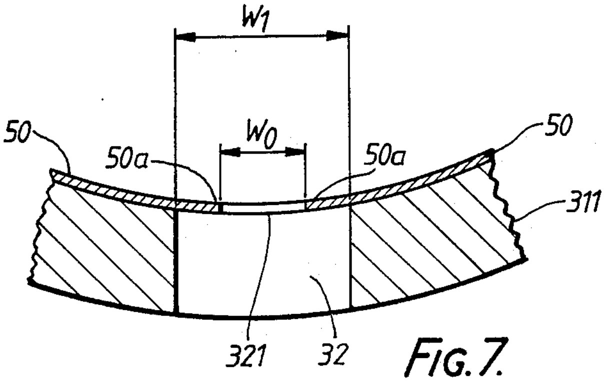
FIG. 7 is an enlarge cross-sectional drawing of the essential part of FIG. 6.

An embodiment of present invention, shown in FIG. 5 to 7, is described in detail with reference to drawings. It will be specifically described in its application to an apparatus particularly useful in an electrographic developing system. In the embodiment shown in the drawings concerning this invention, the same numbering has been used in FIGS. 1 to 4 for parts which are the same as in the construction of a conventional developing system.

As shown in FIG. 5, this invention is designed in the following way. In developer 21 of developing system 20, in the case of toner supply device 30 which supplies toner $T_0$through the entrance port E, the two ends 31*a* and 31*b* of transport guide 311 between the two side frames 211 and 212 of developer 21 are supported by suspension members 411 and 412 of reverse Ω shape, which are secured to cover plate 40, in such a way that, as shown in FIG. 6, the transport guide is in a suspended state in which it is free to move vertically with a slight lateral play. At the same time, the spindles 33*a* and 33*b* of transport auger 33 are supported in gearings in the frames 211 and 212. The transport guide 311 is supported by suspension members 411 and 412 having some distance between each end face of side frames 211 and 212 and each end faces of the guide 311. The design is that gap (a) between transport guide 311 and transport auger 33 can be maintained constant by following the movable operation of transport guide 311. At the same time, the upper part of transport guide 311 slides in the vertical direction guided by guide members 42 which are secured to cover plate 40. The direction and movement of transport guide 311 can thus be controlled. By this means, transport guide 311 is made to vibrate by the vibration of developing roller 22 and the system itself when operating. Also, by keeping gap (a) constant between transport guide 311 and transport auger 33, the transport speed of toner $T_0$ is made constant and good toner supply to developer 21 is possible.

Moreover, the embodiment of this invention is designed in more detail so that, as shown in FIG. 6 and 7, the mouth surrounding supply apertures 32 opened in transport guide 311 is formed of thin elastic plate 50 with a thickness of 20~100 μm made of a synthetic resin film such as polyester resin. Edge portions 50*a* of thin elastic plate 50 which form the mouth surrounding supply apertures 32 are made free to move, and the aperture diameter $W_0$ is essentially maintained by small apertures 321 provided in the mouth. By this means, by making possible the enlargement of apertures diameter $W_1$ of supply apertures 32, inside walls which hold toner $T_0$ in supply apertures 32 are essentially not formed. At the same time, the free edges 50*a* of thin elastic plate 50 will vibrate with the slight vibration of the system itself when operating.

Figure 8:
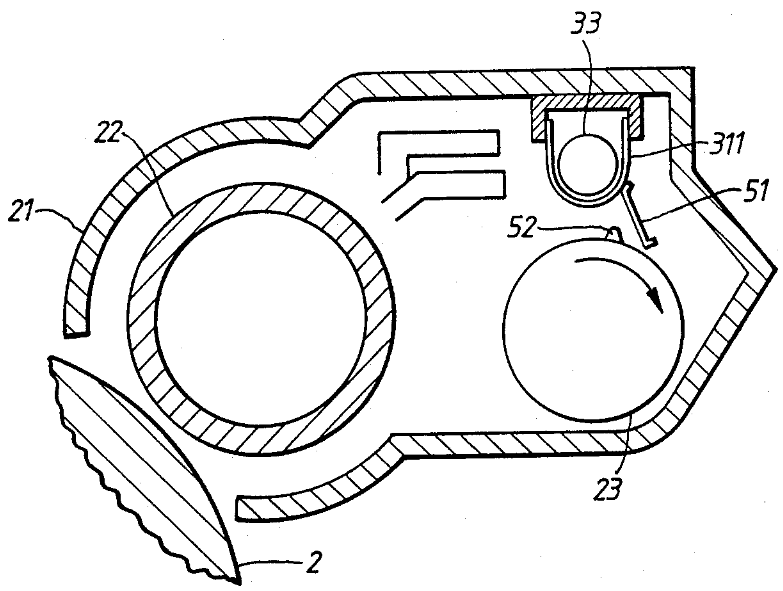
FIG. 8 is a cross-sectional drawing of another embodiment of this invention.

Incidentally, in the above embodiment, the vibration of the system itself when operating is used as the vibration source for the free edges 50*a* of thin plastic plate 50. However, as shown in FIG. 8, a spring tongue 51 may be provided on the side of transport guide 311 and a projection 52 may be provided on a part of the circumference of agitator roller 23 so that it will come into sliding contact with the tip of tongue 51. The vibration due to the contact between tongue 51 and projection 52 which occurs as agitator roller 23 rotates may also be used. Vibration may also be carried out positively by vibration with ultra-sonic waves or the like.

Figure 9:
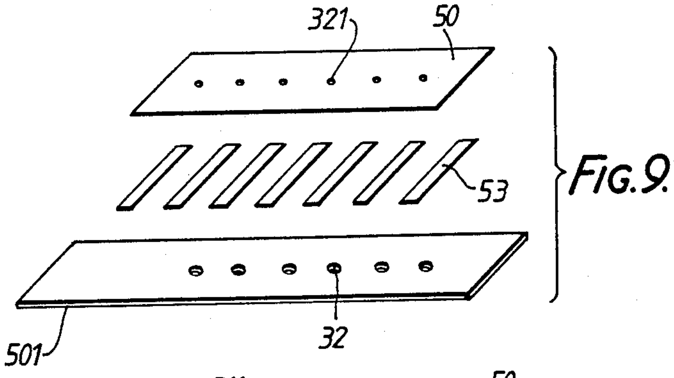
FIGS. 9 to 13 are illustrations of the sequence of production of the toner supply system of this invention.
Figure 10:
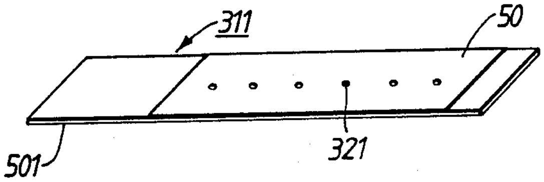
Figure 11:
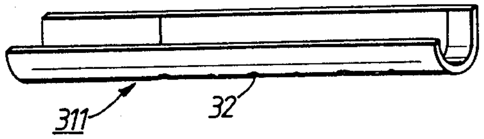
Figure 12:
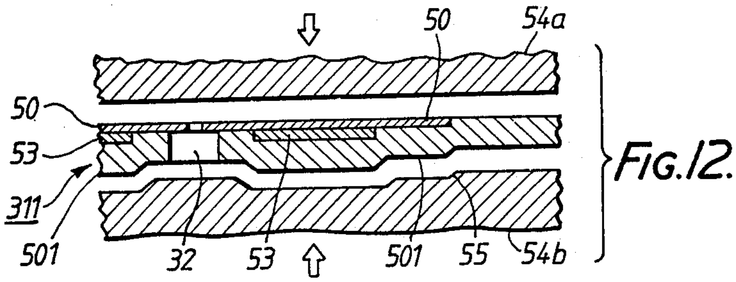
Figure 13:
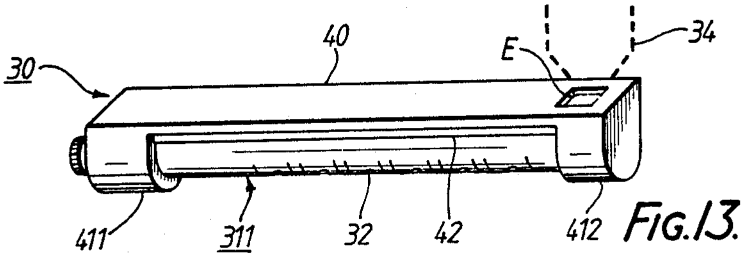

Next, the method of production of the embodiment of this invention is described with particular reference to toner supply system 30. Toner supply system 30 is produced in the sequence shown in FIG. 9 to 13. First, thin elastic plate 50, in which a number of small apertures 321 through which the toner will pass are opened, and aluminum plate 501, in which a number of apertures 32 (supply apertures 32) which are larger than small apertures 321 are opened in positions corresponding to small apertures 321, are prepared and bonded together with double-sided adhesive tape 53 (FIG. 9). These are bonded in a specified position in which the positions of the apertures are matched, as shown in FIG. 10. Metal plate 501 obtained by this bonding is press-moulded to form transport guide 311, as shown in FIG. 11. In order that stepped portions should not be formed in the thickness direction of thin elastic plate 50 and double-sided adhesive tape 53 inside transport guide 311, that is to say the surface where there is contact with transport auger 33, the pressing is carried out by providing specified stepped portions 55 only on the outer mould of press moulds 54*a* and 54*b*, as shown in FIG. 12. Transport guide 311 obtained in this way can transport the toner smoothly without interference to the flow. The toner supply system is produced, as shown in FIG. 13, by suspending transport guide 311 between suspension members 411 and 412. The elastic plate may provide the plural apertured plates for determined positioning for aligning with apertures in the guide.

Incidentally, this invention is not restricted to the above embodiment and, needless to say, various modifications are possible provided they are within limits in which the essentials of this invention are not varied.

As is clear from the above description, a particle dispensing apparatus is composed of an elongated transport guide comprising a base member and an elastic plate adhered on the base member, and the elastic plate has a plurality of apertures which are perforated into the elastic plate for dispensing the particles, transporting means mounted within the transport guide for transporting the particles from the entrance port along the transport guide, such that the transporting means operates, particles are transported from the entrance port through the transport guide and drop through the transport guide apertures to outside of the transport guide, and holding means for holding the transport guide which is arranged so that the transport guide is free to move by receiving a vibration thereof.

When using this invention, since the transport guide is arranged so that it is free to move within the developer and can be vibrated slightly by the vibration due to the rotation of the developing roller in the developing system or the vibration of the developing system itself when operating, even if, by any chance, aggregated toner should block the supply apertures in the transport guide, this aggregated state of the toner can be broken down by this slight vibration of the transport guide and elastic plate. By this means, this invention can provide a particle dispensing apparatus which has the excellent effects of being able reliably to prevent particles clogging in the supply apertures opened in the transport guide, and of always being able to provide a stable particle supply to the system such as the developer.

What is claimed is:

1. A particle dispensing apparatus, comprising:
- an elongated transport guide apertured with a plurality of supply apertures along its length;
- transport means within said guide for transporting particles introduced through an entrance port into the guide and along the guide until they fall through said apertures to the outside of the guide;
- an elastic plate adhered to the inside of said guide, and including shaped edge portions partially covering said supply apertures in the guide; and
- supporting means for supporting said guide so as to be free to move in response to vibratory forces.

2. The apparatus according to claim 1, wherein said elastic plate is free to move relative to said guide.

3. The apparatus according to claim 2, wherein said edge portions in said elastic plate comprise a plurality of plate apertures respectively aligned with said supply apertures and smaller in diameter than said supply apertures.

4. The apparatus according to claim 2, wherein said elastic plate is a thin plate made of the polyester resin.

5. The apparatus according to claim 4, wherein said elastic plate has a thickness of approximately 20~100 μm.

6. The apparatus according to claim 2, wherein said transport guide comprises a base member made of metal and an elastic plate made of the polyester resin.

7. The apparatus according to claim 1, wherein said transport guide is formed with a U-shaped cross-section.

8. The apparatus according to claim 7, wherein said transport guide is provided with said supply apertures in series in the longitudinal on of said U-shaped cross-section.

9. The apparatus according to claim 7, wherein said supporting means are provided for holding said transport guide having reverse Ω shape holding members, 10. The apparatus according to claim 1, wherein said transport guide does not rigidly secure to other members, and has a clearance for vibrating said particles in said transport guide.

11. The apparatus according to claim 10, wherein said supporting means has a pair of suspension members, and opposite ends of said transport guide being slinged by said suspension members.

12. The apparatus according to claim 1, wherein said transport means is provided with a transport auger.

13. The apparatus according to claim 7, wherein said transport means comprises an elongated transport auger disposed within said U-shaped cross-section which is placed adjacent a curved bottom portion of said transport guide.

14. The apparatus according to claim 13, wherein said transport auger is provided with a distance between an outer surface thereof and an inner surface on the curved portion of said transport guide.

15. The apparatus according to claim 1, including vibration producing means and wherein said transport guide is attached with a source of the vibration producing means.

16. The apparatus according to claim 15, wherein said source of the vibration producing means is an intermediate hitting motion.

17. The apparatus according to claim 16, wherein said hitting motion is produced by contact between a tongue comprising a spring having one side secured to said transport guide and another side which is free, and a projection which is provided on the rotatable member.

18. A particle dispensing apparatus, comprising:
- an elongated transport guide apertured with a plurality of supply apertures along its length, the transport guide is formed with a U-shaped cross-section;
- transport means within said guide for transporting particles introduced through an entrance port into the guide and along the guide until they fall through said apertures to the outside of the guide;
- an elastic plate secured inside said guide, and including shaped edge portions partially covering said supply apertures in the guide; and supporting means for supporting said guide so as to be free to move in response to vibratory forces, said supporting means provided for supporting said transport guide having supporting members, said transport guide not being rigidly secured to other members, and having a clearance for vibrating said transport guide and a pair of guide members slidably engaged for guiding both ends of said transport guide.

19. An apparatus for dispensing particles comprising:

an elongated transport guide comprised with an apertured base member with a U-shaped cross-section and an elastic plate adhered on an inside surface of said base member, said elastic plate having a plurality of plate apertures which are perforated into said elastic plate for dispensing particles, said plate apertures being free to move relative to said guide, and said plate apertures having a size smaller than said apertures of said transport guide;

transporting means provided with a transport auger mounted within said transport guide for transporting said particles from an entrance port along said transport guide, such that said transporting means transports particles from said entrance port through said transport guide and said particles drop through said transport guide apertures to outside of said transport guide;

supporting means for supporting said transport guide which is arranged so that it is free to move by receiving a vibration thereof, and provided for supporting said transport guide having reverse Ω shape supporting members, so that said transport guide is not rigidly secured to other members, and having a clearance for vibrating said transport guide and a pair of guide members slidably engaged for guiding at both ends of said transport guide.

* * * * *